(12) United States Patent
Sgarz et al.

(10) Patent No.: US 12,474,497 B2
(45) Date of Patent: Nov. 18, 2025

(54) METHOD FOR OPERATING A MATERIAL INVESTIGATION DEVICE, AND MATERIAL INVESTIGATION DEVICE OF THIS TYPE

(71) Applicant: Robert Bosch GmbH, Stuttgart (DE)

(72) Inventors: Heiko Sgarz, Leonberg (DE); Jan-Michael Brosi, Leinfelden-Echterdingen (DE); Sandra Hagmayer, Neuhausen (DE); Torsten Track, Pulau Pinang (MY); Ina Sophie Boettcher, Simmersfeld (DE)

(73) Assignee: Robert Bosch GmbH, Stuttgart (DE)

( * ) Notice: Subject to any disclaimer, the term of this patent is extended or adjusted under 35 U.S.C. 154(b) by 250 days.

(21) Appl. No.: 18/003,264

(22) PCT Filed: Jun. 17, 2021

(86) PCT No.: PCT/EP2021/066352
§ 371 (c)(1),
(2) Date: Dec. 23, 2022

(87) PCT Pub. No.: WO2022/002605
PCT Pub. Date: Jan. 6, 2022

(65) Prior Publication Data
US 2023/0243996 A1    Aug. 3, 2023

(30) Foreign Application Priority Data
Jun. 30, 2020    (DE) .................... 10 2020 208 116.6

(51) Int. Cl.
*G01V 3/17*    (2006.01)
*G01V 3/38*    (2006.01)
(Continued)

(52) U.S. Cl.
CPC .................. *G01V 3/17* (2013.01); *G01V 3/38* (2013.01); *G06V 10/147* (2022.01); *G06V 10/17* (2022.01); *G06V 2201/07* (2022.01)

(58) Field of Classification Search
CPC .......... G01V 3/17; G01V 3/38; G06V 10/147; G06V 10/17; G06V 2201/07
See application file for complete search history.

(56) References Cited

U.S. PATENT DOCUMENTS

| | | | |
|---|---|---|---|
| 6,609,451 B1 | 8/2003 | Inoue et al. | |
| 2004/0107017 A1* | 6/2004 | Hoffmann | G01V 3/15 700/98 |

(Continued)

FOREIGN PATENT DOCUMENTS

| | | |
|---|---|---|
| DE | 102 05 002 A1 | 8/2003 |
| DE | 10 2011 079 258 A1 | 1/2013 |

(Continued)

OTHER PUBLICATIONS

International Search Report corresponding to PCT Application No. PCT/EP2021/066352, mailed Sep. 16, 2021 (German and English language document) (6 pages).

*Primary Examiner* — Xin Y Zhong
(74) *Attorney, Agent, or Firm* — Maginot, Moore & Beck LLP (57) ABSTRACT

A method for operating a hand-held material investigation device includes transmitting a measurement signal into an object under investigation, and acquiring a position of the material investigation device in relation to a surface of the object under investigation in order to determine a material property of a region, concealed behind the surface, of the object under investigation in a space-resolved and/or direction-resolved manner. The method further includes displaying the material property as at least one digital display object with a physical display unit, and displaying additional (Continued)

measurement information with the same at least one digital display object by way of color coding of the at least one digital display object.

17 Claims, 5 Drawing Sheets

(51) Int. Cl.
  *G06V 10/10*    (2022.01)
  *G06V 10/147*   (2022.01)

(56) References Cited

U.S. PATENT DOCUMENTS

| | | |
|---|---|---|
| 2013/0321621 A1 | 12/2013 | Menzel |
| 2014/0167765 A1 | 6/2014 | Olsson |
| 2014/0347210 A1 | 11/2014 | Sgarz et al. |
| 2016/0103215 A1 | 4/2016 | Watts et al. |
| 2017/0131426 A1* | 5/2017 | Sgarz ............... G01C 15/02 |
| 2021/0248710 A1* | 8/2021 | Jung ................. H04N 19/48 |

FOREIGN PATENT DOCUMENTS

| | | |
|---|---|---|
| DE | 10 2015 211 845 A1 | 12/2015 |
| DE | 10 2020 104 789 A1 | 8/2020 |
| JP | S62-169463 A | 7/1987 |
| JP | H10-82864 A | 3/1998 |
| JP | 2003-98263 A | 4/2003 |
| JP | 2003-159220 A | 6/2003 |
| JP | 3768101 B2 | 4/2006 |
| JP | 2007-264348 A | 10/2007 |
| JP | 2009-276092 A | 11/2009 |
| JP | 2017-519217 A | 7/2017 |
| JP | 2018-516718 A | 6/2018 |
| JP | 2020-508454 A | 3/2020 |
| WO | 2015/197790 A2 | 12/2015 |
| WO | 2019/082292 A1 | 5/2019 |

* cited by examiner

METHOD FOR OPERATING A MATERIAL INVESTIGATION DEVICE, AND MATERIAL INVESTIGATION DEVICE OF THIS TYPE

This application is a 35 U.S.C. § 371 National Stage Application of PCT/EP2021/066352, filed on Jun. 17, 2021, which claims the benefit of priority to Serial No. DE 10 2020 208 116.6, filed on Jun. 30, 2020 in Germany, the disclosures of which are incorporated herein by reference in their entirety.

BACKGROUND

WO 2015/197790 A2 already discloses a method for operating an in particular hand-held material investigation device and a material investigation device of this type, in which a measurement signal is transmitted into an object under investigation, in which a position of the material investigation device in relation to a surface of the object under investigation is acquired in order to determine a material property of a region, concealed behind the surface, of the object under investigation in a space-resolved and/or direction-resolved manner, and in which the material property is displayed in the form of at least one digital display object by way of a physical display unit.

SUMMARY

The disclosure is based on a method for operating an in particular hand-held material investigation device, in which a measurement signal is transmitted into an object under investigation, in which a position of the material investigation device in relation to a surface of the object under investigation is acquired in order to determine a material property of a region, concealed behind the surface, of the object under investigation in a space-resolved and/or direction-resolved manner, and in which the material property is displayed in the form of at least one digital display object by way of a physical display unit.

It is proposed that, in at least one method step, the same display object, in addition to displaying the material property, displays additional measurement information, in particular by way of color coding. The material investigation device preferably comprises a sensor unit, in particular an antenna unit, which transmits and receives electromagnetic waves, in particular in the microwave range and/or in the radio wave range, as measurement signals. In particular, the sensor unit is provided to receive a back-scattered, in particular back-reflected, portion of the transmitted measurement signals. The material investigation device is in particular intended to be arranged on the surface of the object under investigation for the purpose of acquiring the material property, in particular by a user, and to be optionally displaced in relation to the surface, in particular while maintaining a contact of the material investigation device with the surface. Preferably, the material investigation device comprises at least one rolling element, in particular a wheel, roller, ball, or the like, for an arrangement of the material investigation device on the surface and/or for a movement of the material investigation device in relation to the surface. The material investigation device preferably comprises at least one position detection unit, in particular an odometer, which detects the position of the material investigation device in relation to the surface, in particular a displacement in relation to a start position, in particular by detecting a rolling of the rolling element on the surface. In particular, the material investigation device comprises at least one control unit, which evaluates the material property detected by the sensor unit, creates a display object depending thereon, and transmits it to the display unit for output. The material investigation device preferably comprises at least one memory unit. The memory unit is preferably configured as rewritable memory, for example as read-only memory (ROM), as electrically erasable programmable read-only memory (EEPROM), as flash memory (Flash-EEPROM), or the like. In particular, the control unit stores in the memory unit the material property, in particular as raw data and/or in an evaluated form, in association with position data of the material investigation device, which are detected by the position detection unit during a detection of the value to be stored of the material property.

As a material property, the sensor unit in particular detects a scattering behavior, reflection behavior, transmission behavior and/or absorption behavior of the object under investigation with respect to the measurement signal. In particular, the control unit determines spatial variations in the material property. Preferably, the control unit is provided for an investigation of objects under investigation with a spatially homogeneous base material, for example of concrete, solid wood, particle board, plasterboard, ceramic, plastic or another construction material. In particular, from a variation of the material property, the control unit infers inclusions, for example water, and/or foreign bodies, for example bolts, power lines, steel beams, water lines, air entrapments, or the like, in the base material of the object under investigation. In particular, a "homogeneous base material" is to be understood to mean a material in which spatial differences in the material property are less than a difference between the base material and the foreign body or less than a spatial difference due to a location-dependent inclusion, in particular moisture. Preferably, the method comprises a calibration step in which a mean value of the material property of the base material is acquired, by way of a measurement with the sensor unit, as a reference for a distinction between the base material and the inclusion and/or the foreign body. Alternatively or additionally, calibration data for various base materials are stored in a memory of the control unit and/or in the memory unit and are in particular retrieved by the control unit as a reference for a distinction between the base material and the inclusion and/or the foreign body. In particular, the material investigation device is provided for locating foreign bodies and/or detecting a spatial profile of an inclusion in the base material of the object under investigation.

The term "control unit" is understood in particular to mean a unit comprising at least one control electronics. The term "control electronics" should in particular be understood to mean a unit comprising a processor unit and comprising a memory as well as an operating program stored in the memory. The display unit comprises at least one display, particularly preferably a color display, in particular with a resolution of at least 50×50 pixels, preferably of more than 100×100 pixels, particularly preferably of more than 200× 200 pixels.

For example, the display is configured as a liquid crystal display (LCD), a light-emitting diode display (LED display), an organic light-emitting diode display (OLED display), a plasma display panel (PDP), or the like. Optionally, the display unit comprises display control elements for changing a display setting, in particular brightness, contrast, color saturation, or the like, of the display and/or at least one further display element, in particular an indicator light. The term "provided" is understood in particular to mean specifically configured, specifically programmed, specifically designed, and/or specifically equipped. An object being provided for a particular function is understood in particular to mean that the object fulfills and/or performs this particular function in at least one application state and/or operating state.

The term "display object" is to be understood in particular as a representation of an in particular single physical object involved in an investigation of the object under investigation by way of the material investigation device, or an in particular single imaginary object. Physical objects represented by display objects include, in particular, the object under investigation, the surface of the object under investigation, a sub-region of the object under investigation, specifically a foreign body and/or an inclusion in the base material of the object under investigation, and/or the material investigation device. Examples of an imaginary object represented by the display object are a range, in particular a position specification or a value range of the material property, an information box, a sensor range of the object under material investigation, or the like. In particular, taking into account the resolution capacity of the sensor unit, a "single" physical object is to be understood herein as a physical object that can be resolved individually by the material investigation device. In particular, a plurality of physical objects that are close to one another in terms of resolution capacity and/or have a similar value of the material property may be combined by the control unit to form a single display object. A "displayed" physical or imaginary object furthermore refers in particular to a short form for a display object representing said physical or imaginary object. Preferably, the control unit creates and manages the display object; in particular, the control unit updates, activates, or deactivates displaying of the display object. The display unit preferably assigns pixels of the display unit to the display object depending on a control signal of the control unit. The display unit preferably outputs a display in at least one method step of the method. The display preferably comprises at least one background and the at least one display object, in particular a plurality of display objects. Various display objects may be arranged in the display to be spaced apart from one another or to partially cover one another. Preferably, different display objects in the display are delimited from one another and in particular from the background of the display by an outer contour or different filling, in particular coloring. Pixels of the display unit which the display unit assigns to a single display object can be arranged adjacent to or, in particular, in groups, spaced apart from one another.

The control unit preferably creates at least the one display object as a function of the detected material property. In particular, the control unit creates at least one display object that represents a foreign body and/or an inclusion in the base material of the object under investigation. In particular, the display object displays a spatial extension, position and/or orientation of a sub-region of the object under investigation, in particular of a foreign object, with a value of the material property that deviates from the reference, and/or a spatial profile of the material property, in particular of an inclusion. As information, the display object contains in particular a value of the material property, in particular an at least binary or gradual deviation from the reference, and an at least one-dimensional, preferably two-dimensional, optionally three-dimensional position in relation to the material investigation device.

"Additional measurement information" should in particular be understood to mean information derived from the detected location-dependent material property and/or represents a setting of the control unit relevant to the detection of the material property. Examples of the additional measurement information include a material type of a foreign body, a confidence factor of an evaluation of the measurement signal, a detection mode of the sensor unit, an evaluation mode of the control unit, or the like. The additional measurement information is particularly preferably displayed with the same display object, which also represents the material property, by way of coloring and/or by way of gray levels of the display object. Alternatively or additionally, the additional measurement information is encoded, for example by way of a pattern of a filling or outer contour of the display object, by way of a flashing of the display object, by way of a degree of transparency of the display object, by way of a degree of brightness of the display object, or the like. Preferably, the control unit creates at least one further display object for an evaluation of the display object, for example as a range, position reference, or the like. Optionally, the further display object additionally displays the additional measurement information and/or a further piece of additional measurement information. Optionally, the control unit creates at least one additional display object independent of a detection of the material property, such as a charge state indication of the material investigation device, a menu bar, or the like.

By the design according to the disclosure of the method, an advantageously large amount of information can be displayed. Information for foreign objects outside the current sensor range can in particular also be output in an advantageously clear manner.

It is further proposed that the material property and the additional measurement information are output in at least two method steps, in a different representation form in each case. Preferably, the control unit and the display unit change the representation form upon actuation of a control element of the material investigation device by a user. For example, the control unit and the computing unit switch between a representation form in which a depth of a foreign object of the object under investigation is displayed and a representation form in which a maximum drilling depth at which no foreign object of the object under investigation is encountered is displayed. A "depth" is understood in particular to mean the minimum distance of a sub-region of the object under investigation, in particular of a foreign object, from the surface of the object under investigation. For example, the control unit and the computing unit switch between a representation form representing a section perpendicular to the surface of the object under investigation and a representation form representing a top view parallel to the surface of the object under investigation. For example, the control unit and the computing unit switch between a representation form representing a current sensor range of the material investigation device and a representation form representing, based on previous detections of the material property, a panoramic view of the object under investigation beyond the current sensor range. For example, the control unit and the display unit switch between a representation form in which at least two spatial profiles of the material property and/or parameters derived therefrom are displayed superimposed, in particular with a common scale or a double scale, and a representation form in which the at least two spatial profiles are displayed spaced apart from one another, in particular each with their own scale and in particular without overlap. For example, the control unit and the display unit switch between two representation forms which represent different, in particular a logarithmic and a linear, scaling of the material property. Due to the design according to the disclosure, the material investigation device can advantageously be used for many applications.

It is furthermore proposed that, in at least one method step, a current representation form of the display object is identified using the additional measurement information and/or a further piece of additional measurement information. Preferably, at least one display object is configured as a depth reference. The depth reference preferably comprises a line parallel to the indicated surface of the object under investigation, which in particular extends at least from a current indicated detection location to an indicated depth scale. In particular, depending on the setting and/or the representation form, the depth reference is displayed at a depth of the currently detected displayed foreign object, at a depth of the displayed foreign object with the lowest determined depth, at a drilling depth predetermined by the user, and/or at a maximum possible drilling depth, in particular at a safe distance from a displayed foreign object. For example, the additional measurement information of the depth reference is provided to distinguish between a drilling depth and a depth of a displayed foreign object. For example, to identify a drilling depth as additional measurement information, a drill head is displayed, in particular a drill head close to the line of the depth reference. For example, to identify a depth of a displayed foreign object, the drill head is hidden. Due to the design according to the disclosure, handling of the material investigation device can advantageously be intuitively designed. In particular, different representation forms can advantageously be made clearly distinguishable from one another.

It is furthermore proposed that, in at least one method step of the method, the additional measurement information encodes a material type. Preferably, the control unit determines the material type of a sub-region of the object under investigation, in particular of a foreign object, as a function of the spatial variation of the material property. For example, the control unit distinguishes between magnetic metal, non-magnetic metal, current-carrying conductors, non-metals, and other materials. Preferably, display objects representing foreign objects having different types of materials have different colors, in particular different fill colors. Alternatively, the display objects have the same fill color, wherein different types of material are encoded by a color marking, for example a dot, and/or in particular colored symbols inside the display objects. Advantageously, different foreign objects in the base material of the object under investigation can be represented differently by the design according to the disclosure. In particular, foreign objects outside the current sensor range can advantageously be identified. In particular, the number of further display objects for a differentiated identification of foreign objects can advantageously be kept small.

Furthermore, it is proposed that, in at least one method step of the method, a coding of the additional measurement information, in particular the coding already mentioned, is changed. Preferably, the coding is changed as a function of a user input, in particular by way of a control element of the material investigation device. The coding comprises at least one allocation, in particular a plurality of allocations, of a coding element, for example a color of the display object, a pattern of the display object, a symbol of the display object, or the like, to an encoded element, for example a value range of the material property, a determined material type, or the like. Preferably, when the coding is changed, the allocation, in particular individual allocations, is activated or deactivated. In particular, upon deactivation of the allocation, the display unit displays the display object in a default representation. Optionally, the display unit comprises at least one display mode in which the display object is completely hidden when the allocation is deactivated. Optionally, the control unit activates or deactivates a determination of the corresponding encoded element by activating or deactivating the allocation. Alternatively, the control unit, in particular triggered by a user input, changes the allocation itself, i.e., the control unit allocates a new coding element, in particular a different color, to the encoded element. Optionally, at least two different codings are stored in the memory of the control unit, in particular different codings from which a user can select. Due to the design according to the disclosure, the material investigation device is advantageously flexible and individually adaptable to the user, in particular also to users with a color vision deficiency. In particular, the user can advantageously switch between general display modes with many active allocations and a large amount of information, for example in order to determine a possible drilling location, and specific display modes with few active allocations and with a high level of clarity, for example, in order to track an electrical line.

In addition, it is proposed that, in at least one method step, a further display object, which in particular represents the already mentioned sensor range of the material investigation device, undergoes a representation change as a function of the determined material property. Preferably, the display unit shows, at least in the panoramic view, a section of the object under investigation that extends beyond the sensor range of the material investigation device. In particular, the sensor range refers to a measurement volume which is associated with the sensor unit and in which the sensitivity of the sensor unit is above a predetermined threshold value. In particular, the sensor range moves along with the material investigation device and/or with an orientation of the sensor unit in relation to the object under investigation. The further display object representing the sensor range comprises a focus marker representing the most sensitive location of the sensor unit and/or at least one boundary marker which marks the location where the threshold value of the sensitivity of the sensor unit is reached. Preferably, the display unit changes the displayed sensor range to output a warning or an all-clear. Particularly preferably, a representation of the indicated sensor range switches between at least two colors. For example, the display unit displays the sensor range in one representation, in particular in red, if a predetermined drilling depth cannot be achieved due to a foreign object, and in another representation, in particular in green or white, if no foreign object has been determined within the predetermined drilling depth. Optionally, the display unit, along with the display change of the displayed sensor range, will display and hide an additional display object, which will, symbolically and/or as text output, warn of drilling at the current location of the material investigation device. Alternatively, the displayed sensor range is displayed encoded with the currently detected material type. Due to the design according to the disclosure, an application-dependent evaluation of the material property can advantageously be indicated, in particular with advantageously few further display objects.

It is furthermore proposed that, in at least one method step of the method, the additional measurement information constitutes a depth reference, in particular the already mentioned depth reference, as a function of the determined material property. Preferably, the depth reference is displayed encoded with the currently detected material type. Optionally, the user sets a value range for the position of the material investigation device via a control element of the material investigation device, in particular a value range beyond the current sensor range. If the control unit determines several types of material within the set value range for the position of the material investigation device, the depth reference is preferably aligned with the foreign object with the least distance from the surface of the object under investigation and optionally encoded with the material type of said foreign object or in a neutral color. Due to the design according to the disclosure, in case of several foreign objects, the depth reference can advantageously simply be assigned to a particular foreign object.

It is furthermore proposed that, in at least one method step of the method, a coding of the additional measurement information is displayed. Preferably, during operation of the material investigation device, the display unit displays, together with a current measurement, at least one further display object, which indicates the, in particular individual, allocation of the coding, which relates to the currently detected material property, in particular material type. Preferably, in at least one method step of the method, the display unit displays a legend of the coding, which comprises all allocations, all activated allocations, all allocations used to generate the actual display, or a selection, in particular a preset selection, of allocations of the coding. During operation of the material investigation device, the display of the legend can be displayed permanently, for example as a sidebar, along with a display of a current measurement or can be displayed in a manner temporarily covering the display of the current measurement. Preferably, by actuating a control element of the material investigation device, a user triggers a display of the coding. The coding, in particular the legend, can be hidden by actuating or releasing a control element of the material investigation device or automatically, in particular after a predetermined period of time has elapsed. Due to the design according to the disclosure, the material investigation device can advantageously be easily operated and read.

It is furthermore proposed that, in at least one method step of the method, a displayed value range for the material property and/or the additional measurement information is adjusted. An adjustment of the value range can be automatically adjusted by the control unit, in particular as a function of a detected value range of the material property, or can be adjusted by a user by actuating a control element of the material investigation device. For example, when adjusting the value range, a minimum value and/or a maximum value of the value range are/is set, which is displayed. For example, when adjusting the value range, a switch is made between a logarithmic and a linear scaling of the value range. Due to the design according to the disclosure, the display can be designed to be advantageously application-dependent and advantageously flexible. In particular, an area of the display can advantageously be well utilized.

Furthermore, the disclosure is based on a method, in particular the already mentioned or an alternative method, for operating an in particular hand-held material investigation device, in particular the already mentioned or an alternative material investigation device, in which a measurement signal, in particular the already mentioned measurement signal, is transmitted into an object under investigation, in particular the already mentioned object under investigation, and a position of the material investigation device in relation to a surface, in particular the already mentioned surface, of the object under investigation, is acquired in order to determine a material property, in particular the already mentioned material property, of a region, concealed behind the surface, of the object under investigation in a space-resolved and/or direction-resolved manner.

It is proposed that, in at least one method step, a representation of the material property is stored as an image by the material investigation device. In particular, a control unit, in particular the already mentioned control unit, of the material investigation device stores the image in a memory unit, in particular the already mentioned memory unit, of the material investigation device. The control unit creates, as a function of the measurement signal, at least one display object, in particular the already mentioned display object, which is represented in the image. In particular, the method described herein and the previously described method can be implemented independently of one another or in combination with one another, in particular in the already previously mentioned material investigation device or an alternative material investigation device. The two methods neither require nor exclude one another. In a preferred design, in which both methods are implemented in combination, advantageous synergy effects result in particular. Optionally, the control unit outputs the image on a display unit of the material investigation device, in particular the already mentioned display unit. For example, the image shows a sectional view of the object under investigation, a plan view of the surface, shown in particular transparent, of the object under investigation, a three-dimensional section of the object under investigation, a one- or more-dimensional spatial profile of the material property, or the like. Preferably, the image is stored in a non-volatile memory of the memory unit and/or on a memory card. Optionally, raw data detected by a sensor unit, in particular the already mentioned sensor unit, of the material investigation device and/or values of the material property determined by the control unit from the raw data are stored, in particular in addition to the image, in particular in the non-volatile memory. Alternatively, raw data detected by the sensor unit and/or values of the material property determined by the control unit from the raw data are stored in the volatile memory and actively deleted and/or released for overwriting, in particular after creating the image or after ending a measurement series in which in particular a plurality of images are created.

By the design according to the disclosure of the method, the material property can advantageously be detected and saved for later use and/or evaluation by the same device. In particular, an external recording device for recording the image can advantageously be dispensed with. In particular, a large amount of information can be stored. In particular, information for foreign objects outside the current sensor range can advantageously also be stored. In particular, the material property, which has already been pre-evaluated and encoded, in particular in color, can advantageously be stored.

It is furthermore proposed that, in at least one method step of the method, a current display of the material property is stored by way of a display unit, in particular the already mentioned display unit, of the material investigation device. In particular, the control unit and display unit create a screenshot, which is saved as the image. The screenshot may comprise the entire display of the display unit, for example including a menu bar, status indicator, side bars, or the like, or a section of the display, in particular a section of the display representing the material property. Optionally, via a control element of the material investigation device, the user selects the section of the display to be stored as a screenshot during the storing process and/or in a setting phase of the method preceding the storing process. In particular, the control unit stores, as an image in the memory unit, a copy of a data stream, sent to the display unit, for outputting the display. Due to the design according to the disclosure, a user can advantageously simply store the material property as an image. In particular, the display of the display unit can advantageously serve as a preview of the image.

Furthermore, it is proposed that, in at least one method step of the method, the image is newly generated from current measurement data of the material investigation device specifically for storing. The control unit generates the image independently of the display and stores it in the memory unit, in particular without outputting by way of the display unit. Optionally, the image is stored at a different, in particular higher, resolution than the display is output. Due to the design according to the disclosure, the image can advantageously be stored independently of a restriction of the display unit, in particular the size and resolution capacity of the display. In particular, a higher information content can be inserted into the image.

It is furthermore proposed that the image be additionally newly generated from additional data detected in a previously performed measurement. Preferably, the memory unit at least temporarily stores current measurement data as additional data in the memory unit or in a memory of the control unit for later use, in particular for a representation of the material property in a section of the object under investigation that extends beyond a current sensor range of the material investigation device. In particular, the control unit generates the image and/or the display from the current measurement data, which were in particular detected in the current sensor range, and from the additional data. Due to the design according to the disclosure, the image can represent an advantageously large section of the object under investigation. In particular, the measured section of the object under investigation can be stored in advantageously few images. In particular, an overhead of the images can advantageously be kept small.

Furthermore, it is proposed that, in at least one method step of the method, the newly generated image be stored in a representation different from a representation form of a current display of a display unit of the material investigation device. A display of the display unit is generated by the control unit from the current measurement data and optionally from the additional data detected by the sensor unit and processed by the control unit. In addition to the material property, the display comprises, as further or additional display objects, for example, a status indicator, a menu bar, a time, warnings, the current sensor range, or the like, which are in particular displayed overlapping in part with the material property. Preferably, in at least one method step of the method, the user or the control unit selects, via a preset profile, whether and in particular which display objects are stored in the image, in particular in addition to the material property. The stored image may be identical to the display of the display unit or may be different from the display. Optionally, the newly generated image is output on the display unit for confirmation by the user. Optionally, the image is stored in a multi-layer image format, wherein in particular one layer of the image comprises the material property, and at least one further layer comprises further display objects and/or additional display objects. Due to the design according to the disclosure, the image can advantageously be adapted to a further use and/or evaluation. In particular, further display objects and pre-evaluations can additionally be integrated into the image, which objects and pre-evaluations are in particular not necessary in the display for performing the measurement and/or make it difficult to perform the measurement by overloading the display. In particular, further and/or additional display objects that are irrelevant to the further use and/or evaluation can advantageously be omitted from the image. Furthermore, the display may advantageously be adapted to the measurement process with the sensor unit, for example by displaying orientation aids, or the like, in particular without regard to whether the display is suitable for evaluation and/or further use.

Furthermore, it is proposed that, in at least one method step of the method, at least two stored images of the material property be combined into a single image. The control unit merges, into a single image, at least two images created at different positions of the material investigation device in relation to the surface of the object under investigation, or created at the same position with different settings of the material investigation device, in particular of the sensor unit. Preferably, the control unit stores the images to be merged together with an overhead. In particular, the overhead comprises the position of the material investigation device in relation to the surface of the object under investigation at which the image was acquired and/or the settings of the sensor unit with which the image was acquired. The overhead may be configured as a standalone file or may be stored along with the associated image in a single metafile. Preferably, in the case of overlapping images, the control unit fuses an overlap region of the images with a stitching method known per se. Optionally, in the case of spaced-apart images, the control unit interpolates an intermediate region between the images. Due to the design according to the disclosure, an advantageously large section of the object under investigation, which section is in particular larger than the material investigation device itself, can be shown in a single image.

In addition, it is proposed that, in at least one method step of the method, storing of the image is triggered by a user of the material investigation device. In particular, the material investigation device comprises at least one control element for triggering the storing. Optionally, the display unit indicates, depending on the current position of the material investigation device and the position at which an image was last stored, whether a new image should be stored at the current position, in particular for a seamless merging of a plurality of images and/or for avoiding redundant data. Preferably, the control element is operable to trigger the storing with the same hand with which the material investigation device is held, in particular by arranging said control element at and/or near a handle of the material investigation device. Due to the design according to the disclosure, the user has advantageously great control over the selection of what is stored and over the volume of data required for this purpose. In particular, a downstream review of the images may advantageously be short.

Furthermore, it is proposed that, in at least one method step of the method, the image is automatically stored. The control unit stores images in particular at regular spatial and/or time intervals. Additionally or alternatively, storing is triggered by the detection of a foreign object in the otherwise homogeneous base material of the object under investigation. The automatic storing can in particular take place for the entire duration of an operation of the material investigation device. Alternatively, the automatic storing takes place for the duration of a user-activated recording mode of the material investigation device. Alternatively, the automatic storing takes place for the duration in which a user actively actuates a control element of the material investigation device, in particular against a resetting force. Due to the design according to the disclosure, the section can advantageously be systematically acquired and stored in images. In particular, seamless storing of the material property can advantageously be achieved easily.

It is furthermore proposed that, in at least one method step of the method, the image is transmitted to an external storage device via an interface, in particular the already mentioned interface, of the material investigation device. The interface may be wired, for example as a USB port, as a Lightning port, as an R-232 port, as an Ethernet port, or the like; wireless, in particular radio-wave-bound, for example as a Wi-Fi module, Bluetooth module, ZigBee module, or the like; and/or data carrier-bound, in particular as a memory card reader and memory card writer. Preferably, the control unit transmits the image via the interface to the external storage device, in particular for post-processing of the image, for an evaluation of the material property shown in the image, and/or for digitally logging a measurement with the material investigation device. Alternatively or additionally, the control unit transmits, via the interface to the external storage device, raw data from the sensor unit and/or the material property determined by the control unit. For example, the external storage device may be configured as a smartphone, tablet, server, PC, or the like. Due to the design according to the disclosure, the memory unit of the material investigation device can advantageously be kept small or be realized by the memory of the control unit. In particular in the case of an at least partial outsourcing of the evaluation of the measurement signal, a maximum computing power and an energy consumption of the control unit can advantageously be kept small.

In addition, an in particular hand-held material investigation device with a control unit, in particular the already mentioned control unit, and with a display unit, in particular the already mentioned display unit, in particular a color display, for performing a method according to the disclosure is proposed. The material investigation device comprises the sensor unit, in particular the antenna unit, which comprises at least one transmitting element for transmitting electromagnetic waves, in particular in the microwave range and/or in the radio wave range, and at least one receiving element for receiving electromagnetic waves, in particular in the microwave range and/or in the radio wave range. Optionally, the transmitting element and the receiving element are formed by the same component, in particular by the same antenna element. The sensor unit preferably comprises transmitter and receiver electronics comprising, for example, a signal generator, an amplifier, analog and/or digital signal filters, or the like. The material investigation device preferably comprises a housing that receives the sensor unit and/or on which the sensor unit is arranged. The term "hand-held" should be understood to mean holdable and/or transportable by hand without the aid of holding equipment and/or transport equipment. In particular, the material investigation device has a mass of less than 20 kg, preferably less than 10 kg, particularly preferably less than 5 kg. Optionally, the material investigation device comprises a handle protruding from the housing, recessed handles recessed into the housing and/or grip surfaces arranged on the housing for a user to guide the material investigation device. Preferably, the material investigation device comprises at least the rolling element, in particular two, preferably four rolling elements, which is/are mounted on the housing. The display unit is arranged on the housing, in particular on a side of the housing facing away from the rolling element, in particular embedded therein. The material investigation device comprises the at least one position detection unit, in particular an odometer. The material investigation device comprises at least the memory unit. The memory unit may comprise a volatile memory, in particular for displaying values of the material property from a previous measurement in a current measurement, and/or a non-volatile memory, in particular for an evaluation of the material property downstream of the current measurement. Optionally, the memory unit comprises a read and/or write element for replaceable data carriers, in particular memory cards and/or memory sticks. Alternatively or additionally, the material investigation device comprises an interface for wired and/or wireless, in particular radio-wave-bound, communication with an external device, in particular for an external evaluation and/or preparation of the detected location-dependent material property. The material investigation device comprises at least one control element, in particular a plurality of control elements, such as a button, a switch, a slider, a control dial, or the like, for user input. Alternatively or additionally, the display of the display unit is configured as a touch screen. In particular, the control unit, the memory unit, the interface, the position detection unit and/or the sensor unit is/are arranged within the housing. Due to the design according to the disclosure, a material investigation device that is advantageously user-friendly and advantageously intuitively hand-held can be provided. In particular, a material investigation device can be provided, with which an advantageously large amount of information can be represented clearly.

The method according to the disclosure and/or the material investigation device according to the disclosure is/are not intended to be limited to the above-described application and embodiment. In particular, for fulfilling a functionality described herein, the method according to the disclosure and/or the material investigation device according to the disclosure can comprise a number of individual elements, components, units, and method steps that deviates from a number mentioned herein. Moreover, in the case of the value ranges specified in this disclosure, values within the mentioned limits are also to be considered as disclosed and usable as desired.

BRIEF DESCRIPTION OF THE DRAWINGS

Further advantages become apparent from the following description of the drawings. The drawings show an exemplary embodiment of the disclosure. The drawings, the description and the claims contain numerous features in combination. The person skilled in the art will expediently also consider the features individually and combine them to form further meaningful combinations.

The Figures Show.

DETAILED DESCRIPTION

Figure 1:
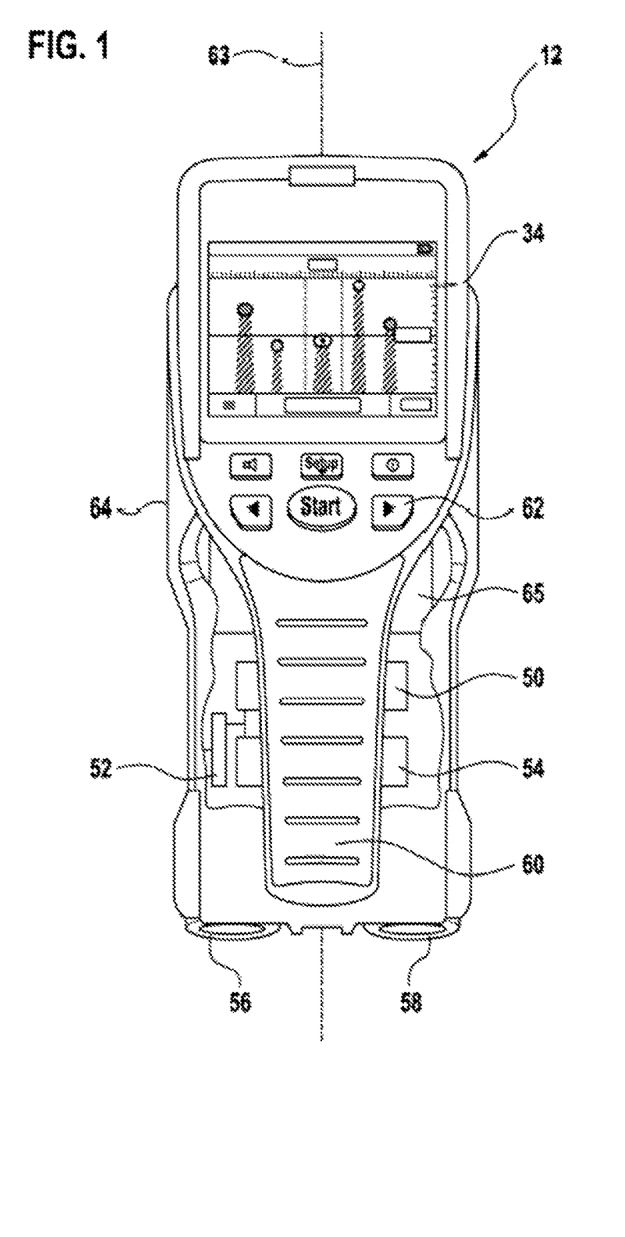
FIG. 1 a schematic representation of a material investigation device according to the disclosure, FIG. 2 a schematic representation of a method according to the disclosure, FIG. 3 a schematic representation of display objects in the course of a depth measurement using the method according to the disclosure, FIG. 4 a schematic representation of display objects in the course of a change of a representation form in the course of the method according to the disclosure, FIG. 5 a schematic representation of display objects in the course of a moisture measurement using the method according to the disclosure, and FIG. 6 a schematic representation of display objects with an orientation aid in the course of the method according to the disclosure.

FIG. 1 shows a material investigation device 12. The material investigation device 12 is in particular configured for locating foreign objects and/or inclusions, in particular water, in a base material of an object under investigation 14 (cf. FIG. 3), in particular a wall, a floor, a ceiling, or the like. The material investigation device 12 comprises a housing 64. The material investigation device 12 comprises a sensor unit 65 for transmitting and receiving electromagnetic waves, in particular microwaves and/or radio waves. The sensor unit 65 is arranged in the housing 64 and/or on a support side of the housing 64. The support side of the housing 64 is in particular provided to be oriented toward a surface 16 of the object under investigation 14 in a measurement with the material investigation device 12. The material investigation device 12 preferably comprises a handle 60, in particular protruding from the housing 64 or formed by the housing 64, for manual guidance of the material investigation device 12 along the surface 16 of the object under investigation 14. Preferably, the material investigation device 12 comprises at least one rolling element 56, 58, preferably a plurality of, in particular four, rolling elements 56, 58. The rolling members 56, 58 are mounted on the housing 64. In particular, the rolling elements 56, 58 are provided for direct contact with the surface 16 and for a spaced-apart arrangement of the support side of the housing 64, in particular of the sensor unit 65, from the surface 16 of the object under investigation 14. The material investigation device 12 comprises at least one path sensor (not shown here), which is in particular provided to determine a displacement of the material investigation device 12 in relation to the surface 16 of the object under investigation 14 by detecting a rolling of at least one of the rolling elements 56, 58. Preferably, the material investigation device 12 has a longitudinal axis 63. In particular, a rotational plane of at least one of the rolling members 56, 58 extends at least substantially perpendicular to the longitudinal axis 63. Alternatively, the rotational plane of at least one of the rolling members 56, 58 is arranged at least substantially parallel to the longitudinal axis 63 or can additionally be oriented in such a manner. The material investigation device 12 comprises a control unit 50 for performing a method 10, which is explained in more detail in FIGS. 2 to 6. The material investigation device 12 comprises a memory unit 54. The material investigation device 12 comprises a display unit 34 for displaying a measurement result of the sensor. Particularly preferably, the display unit 34 is configured as a color display. The display unit 34 is arranged on a side of the housing 64 facing away from the support side. The material investigation device 12 comprises at least one control element 62. For example, the material investigation device 12 is configured to display foreign objects in a sectional view of the object under investigation 14 (cf. FIGS. 3 and 4, for displaying foreign objects in a plan view on the surface 16, which is in particular shown transparent, (cf. FIG. 5) and/or for displaying a curve profile 100 of the measurement signal, of the material property, or the like (cf. FIG. 6). The material investigation device 12 can in particular be configured as a special device for one of the mentioned representations or as a general-purpose device, which can switch between a plurality of the mentioned representations.

Figure 2:
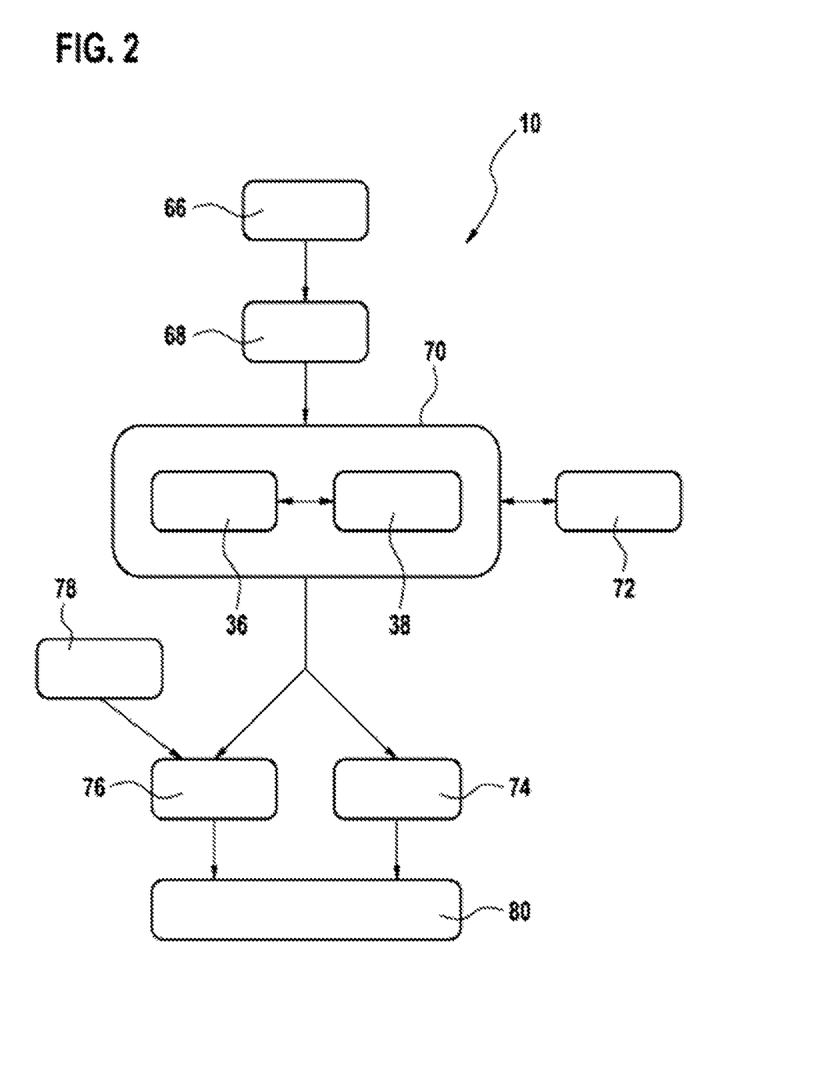

FIG. 2 shows a flow chart of the method 10. The method 10 comprises a measurement step 66. The method 10 comprises a storing step 68. The method 10 comprises a display step 70. The method 10 comprises a coding indicator step 72. The method 10 in particular comprises a display storing step 74. Alternatively or additionally, the method 10 comprises an image generation step 76. Optionally, the method 10 comprises a setting step 78. The method 10 comprises an image post-processing step 80.

The method 10 is provided for operating a material investigation device 12. In the measurement step 66, a measurement signal is transmitted into the object under investigation 14 (cf. FIG. 3). A position of the material investigation device 12 is detected by the path sensor in relation to the surface 16 of the object under investigation 14. A material property of a region 18, concealed behind the surface 16, of the object under investigation 14 is determined in a space-resolved and/or direction-resolved manner. In the storing step 68, the material property and the position are stored together in a volatile memory of the memory unit 54 and/or in a non-volatile memory of the memory unit 54 by the control unit 50. In the display step 70, the material property is displayed in the form of at least one digital display object 20, 22, 24, 26, 28, 30, 32 (see FIG. 3) by way of the display unit 34. In at least one method step, the same display object 22, 24, 26, 28, 30, 32, in addition to displaying the material property, displays additional measurement information, in particular by way of color coding 39. The material property and the additional measurement information are output in the display step 70, each in a different representation form 36, 38. The current representation form 36, 38 of the display object 32 is identified using the additional measurement information and/or a further piece of additional measurement information. In the display step 70, the additional measurement information encodes a material type. During the display step 70 or a presetting step of the method 10, the coding 39 of the additional measurement information is changed, in particular by way of the control element 62. In the coding indicator step 72, the coding 39 of the additional measurement information is displayed.

During the display step 70 or a presetting step of the method 10, a value range 46, 47, 48 shown (cf. FIGS. 3 to 6) for the material property and/or the additional measurement information is adjusted, in particular by way of the control element 62.

In at least one method step of the method 10, a representation of the material property is stored as an image by the material investigation device 12. In the display storing step 74, a current display of the material property created by way of the display unit 34 of the material investigation device 12 is stored. In particular, the image rendered for the display is stored as a file in the memory unit 54 or an external storage device. After the storing is triggered, in particular by the user, the material investigation device 12 stores the current display of the display unit 34 as a graphics file. If information outside of the current display is available, it is optionally also stored. In the case of a material investigation device 12, which can detect a displacement of the material investigation device 12 in a dimension parallel to the surface 16, a wider image is thereby generated, which image contains, for example, the information of the entire measured region. In the case of a material investigation device 12, which can detect a displacement of the material investigation device 12 in two dimensions parallel to the surface 16, the image is optionally expanded in these two dimensions as compared to the display. In the image generation step 76, the image is newly generated from current measurement data of the material investigation device 12, specifically for storing. In the image generation step 76, the image is additionally newly generated from additional data that were detected in a previously performed measurement and, in particular, stored in the storing step 68. In the image generation step 76, the newly generated image is stored in a representation different from the representation form 36, 38 of the current display of the display unit 34 of the material investigation device 12. The image to be stored is generated in the image generation step 76 from the available measurement data independently of the display. The image generation step 76 may be performed in addition to or as an alternative to the display storing step 74. Optionally, additional information, which is in particular not contained in the display, is displayed in the image. Optionally, the type of representation is adjusted for an external evaluation or further use of the image. Preferably, for the sake of clarity, particular data, e.g., the depth of a foreign object found, are displayed in the display only for the current detected foreign object. Data, for example the depth, a possible drilling depth and/or the material type, in particular the optically encoded material type, for each foreign object are optionally specified in the stored image. Alternatively, storing of the image is automatically triggered, for example after a measurement has been completed. In at least one method step of the method 10, the storing of the image is triggered by a user of the material investigation device 12. In at least one method step of the method 10, the image is stored automatically. Optionally, an overhead is stored in addition to the image. For example, the overhead comprises information about foreign objects found, about a one-dimensional path, or about a two-dimensional area that was traversed with the material investigation device 12. Alternatively, the overhead is stored as a data file, in particular instead of the image. In the image post-processing step 80, at least two stored images of the material property are combined into a single image. In particular, a single image is created from a plurality of images by stitching in one or two dimensions. In the image post-processing step 80, the image is optionally transmitted to an external storage device via an interface 52 of the material investigation device 12.

Figure 3:
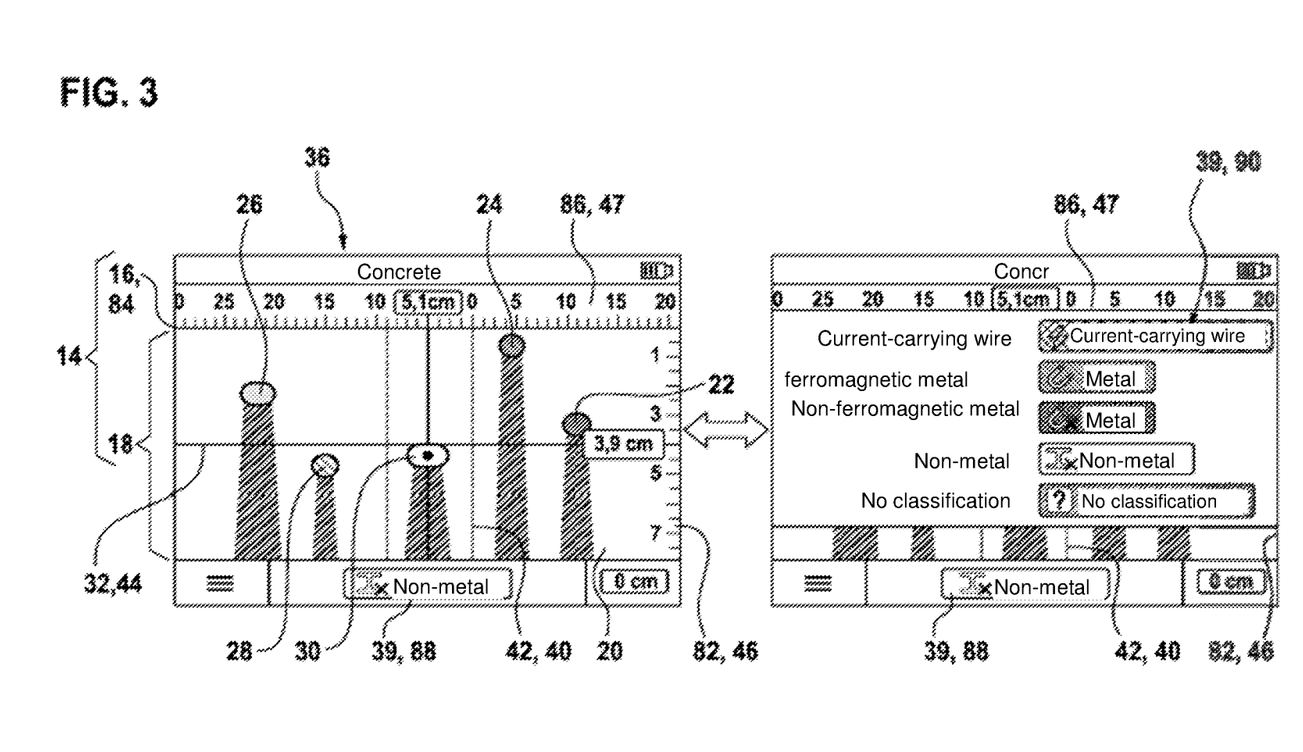

FIG. 3 shows, by way of example, a display of the display unit 34. The display unit 34 shows the display objects 20, 22, 24, 26, 28, 30, 32 representing a material property of the object under investigation 14. The display unit 34 displays further display objects 42, 82, 84, 86, 88 for an evaluation of the material property, for example a sensor range 40 of the material investigation device 12, the value range 46, 47, in particular a lateral position and a depth, of the material property, the surface 16 of the object under investigation 14, a short form of the coding 39, or the like. Optionally, the display unit 34 displays additional display objects that are independent of the material property, for example a charge state indication of the material investigation device 12, a menu bar, a material calibration of the material investigation device 12, or the like. In at least one method step of the method 10, the additional measurement information of one of the display objects 32 represents a depth reference 44 as a function of the determined material property. In particular, the display unit 34 displays the depth reference 44 with the same coding 39, in particular with the same color, as the material property currently located in the sensor range 40. In the coding indicator step 72, the display unit 34 displays the coding 39 as a legend 90. In particular, the display unit 34 displays display objects 20, 22, 24, 26, 28, 30, 32, which represent foreign objects found and/or a base material of the object under investigation 14, by geometric shapes, such as dots or elongated dots, in particular lines. The coding 39, which reflects the additional measurement information, is realized by coloring the shapes. It may also be advantageous to color only a part of the shape of one of the display objects 20, 22, 24, 26, 28, 30, 32 when detection is the focus. A non-colored part, for example an outer circle, of the display object 20, 22, 24, 26, 28, 30, 32 stands for the detected foreign object. A colored part of the display object 20, 22, 24, 26, 28, 30, 32, for example a dot in a center of the display object 20, 22, 24, 26, 28, 30, 32, stands for the coding 39. As an alternative or in addition to colors, the coding 39 may also be realized by way of symbols and/or text. In order to give meaning to the colors, the legend 90 is displayed. The legend 90 may be displayed automatically and/or via the control element 62 configured as a button. Additionally or alternatively, further display objects 20, 22, 24, 26, 28, 30, 32, such as symbols and/or text relating to the currently detected sub-region of the object under investigation 14, are displayed, in particular in order to make the operation more intuitive. As a result, the user can advantageously learn the importance of the colors during use, in particular without resorting to the legend 90. If only particular classes of foreign objects are of interest, it is possible to display the foreign objects unencoded and/or to hide the foreign objects. Optionally, an acoustic output of recognized objects supports or replaces the optical coding 39 by encoding an acoustic signal in clear text depending on the material property, for example by way of a frequency, a sound volume or an announcement of the material property, in particular the material type.

Figure 4:
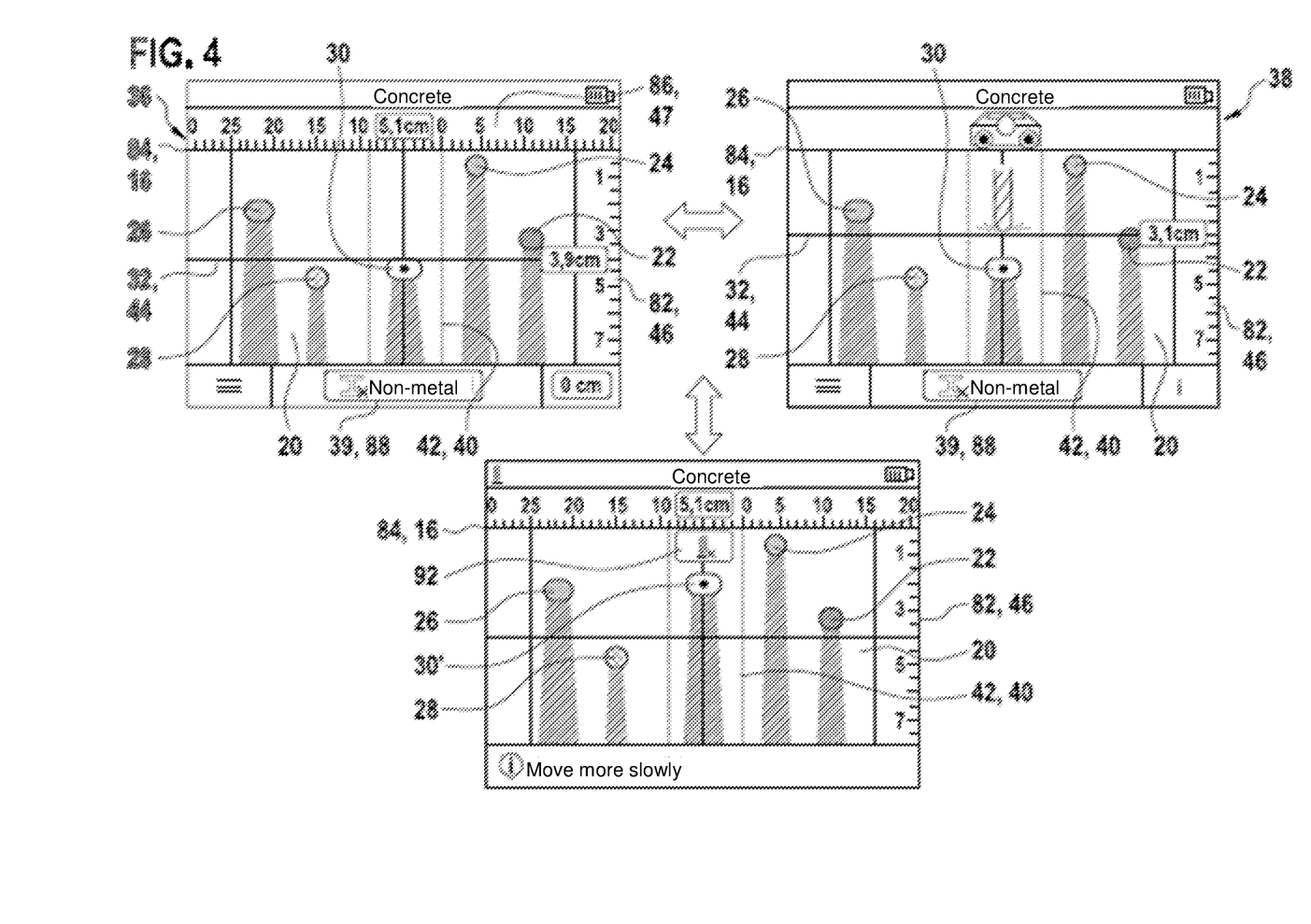

FIG. 4 shows, by way of example, a change of the representation form 36, 38 of a display of the display unit 34. By way of example, one of the representation forms 36, referred to as "object depth" for distinction, is configured for an evaluation of a depth of the material property. By way of example, one of the representation forms 38, referred to as "drilling depth" for distinction, is configured for an evaluation of a maximum allowed drilling depth. In at least one method step of the method 10, a further display object 42 representing the sensor range 40 of the material investigation device 12 undergoes a representation change as a function of the determined material property. In particular, the sensor range 40 is shown differently, in particular differently colored, in the case of a free drilling path than when an anomaly represented by the display object 30' is detected in the drilling path. Optionally, in particular additionally, a warning message 92 is output on the display unit 34. For example, switching between representation forms 36, 38 is performed via a settings menu or a shortcut key. In the "object depth" representation form 36, the horizontal depth reference 44 of the current detected foreign object is located directly on an object upper edge of the foreign object, which faces the displayed surface 16 of the object under investigation 14, thus indicates the depth of the foreign object. A marker of the depth reference 44 highlights the depth on a further display object 82 configured as a depth scale, thus assisting in reading. The marker and the depth reference 44 are color-matched to the currently detected foreign object in order to underscore the association. A focus marker as well as two boundary markers, shown dashed here, represent the sensor range 40. The boundary markers are in particular arranged at the outer edges of the material investigation device 12. The focus marker and the boundary markers are displayed red as soon as a foreign object is in the sensor range 40, in particular between the dashed boundary markers, otherwise green. In the "drilling depth" representation form 38, the depth reference 44 is at a defined distance, in particular a safety margin, to the foreign objects relevant to drilling. The foreign object used for the depth reference 44 may be the currently detected foreign object, or a plurality of foreign objects is used, wherein the object with the lowest depth is decisive. If multiple objects are significant for the depth reference 44, the marker and the depth line are shown in a neutral color. In order to indicate that the "drilling depth" representation form 38 is currently selected, a drill is displayed on the depth reference 44, in particular within the sensor range 40. In a region from the displayed surface 16 to the depth reference 44, the boundary markers and/or the focus marker are displayed in green, in particular to indicate that drilling is possible. In a region from the depth reference 44 to an end of the displayed object under investigation 14 facing away from the displayed surface 16, the boundary markers and/or the focus marker are shown in red, in particular to warn of a foreign object. If drilling is not possible because the foreign object is too flat, an icon will be displayed symbolizing "drilling is not possible." In both representation forms 36, 38, an acoustic output optionally additionally warns of foreign objects. Optionally, the user sets a desired drilling depth. The display unit 34 optionally displays only foreign objects that inhibit drilling to the desired drilling depth.

Figure 5:
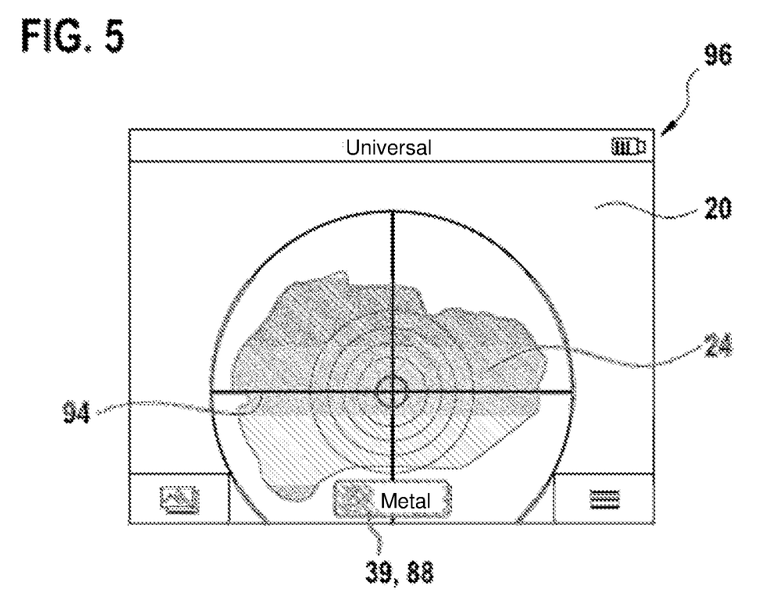

FIG. 5 shows a further representation form 96 with which the display unit 34 displays the material property. In particular, as a further display object, the further representation form 98 comprises an orientation aid 94, here in the form of crosshairs, for a lateral orientation of the material investigation device 12 in relation to the surface 16. The further representation form 96 may be displayed by the display unit 34 as an alternative or in addition to the representation forms 36, 38.

Figure 6:
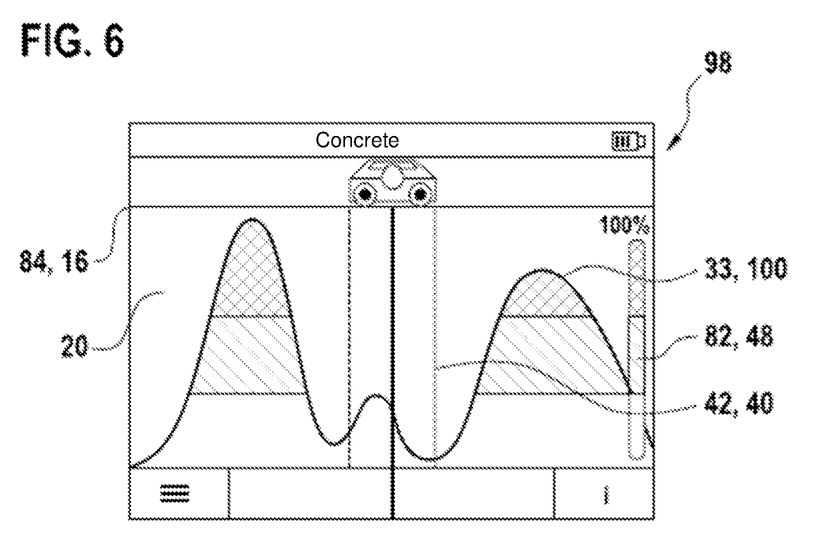

FIG. 6 shows an additional representation form 98 with which the display unit 34 displays the material property by way of a display object 33 configured as a curve profile 100. In particular, the additional measurement information is displayed in an area bounded by the curve profile 100 or as a representation of the curve profile 100, for example, as a color or as a pattern of the curve profile 100. For example, the curve profile 100 is a measure of the probability that a foreign object is located at the corresponding location or a measure of how moist the object under investigation 14 is. If additional measurement information is available, further curve profiles are optionally displayed. The curve profiles 100 may overlay, in particular with the same or a double scale, for example, with depth of a foreign object, transit time of the measurement signal, signal strength of the measurement signal, and/or probability of a foreign object. Alternatively, a plurality of curve profiles 100 are each displayed with their own coordinate system, wherein the coordinate systems are displayed displaced in parallel to a scale, in particular an ordinate, of the coordinate systems. Alternatively, the curve profile 100 or the area between the curve profile 100 and the abscissa axis of the coordinate system associated with the curve profile 100 is colored or otherwise graphically altered according to the additional measurement information. For example, the curve profile 100 itself indicates a probability of the presence of a foreign object or a signal strength of the detected measurement signal. For example, the color of the curve profile 100 or the area between the curve profile 100 and the abscissa axis indicates information about the material type of the foreign object. Preferably, the display is parameterizable by the user, meaning that the displayed value range 48 is adjustable for the additional measurement information. In particular, the displayed value range 48 is adjustable independently of how much information is displayed, in particular independently of whether one or more curve profiles 100 are displayed with or without coloration. For example, a minimum value and/or a maximum value of a scale of the coordinate system or of the additional measurement information is adjustable. The minimum value is used to set how small or weak the smallest foreign object that can be found can be. In particular, with an increase in the minimum value, an undesirable signal portion in the measurement signal, in particular a noise and/or clutter, can be hidden. With the maximum value, a maximum displayed signal strength of the measurement signal is adjustable, in particular so that an area of the display unit 34 is advantageously utilized, even in the case of weak measurement signals. The adjustment of the displayed value range 48 can be carried out manually by the user or can be performed automatically depending on other user settings, such as base material, or entirely automatically as a function of a reference determined by the sensor unit 65.

The invention claimed is:

1. A method for operating a hand-held material investigation device, comprising:
   transmitting a measurement signal into an object under investigation;
   acquiring a position of the material investigation device in relation to a surface of the object under investigation in order to determine a material property of a region, concealed behind the surface, of the object under investigation in a space-resolved and/or direction-resolved manner;
   displaying the determined material property as at least one digital display object with a physical display unit of the material investigation device;
   displaying additional measurement information with the same at least one digital display object by way of color coding of the at least one digital display object;
   displaying a further digital display object representing a sensor range of a sensor unit of the material investigation device; and
   changing a representation of the displayed further digital display object representing the sensor range as a function of the determined material property,
   wherein the determined material property and the additional measurement information are both displayed in a first representation form and in a second representation form,
   wherein the first representation form is a section perpendicular to the surface of the object under investigation, and
   wherein the second representation form is a top view parallel to the surface of the object under investigation.

2. The method according to claim 1, wherein:
   the determined material property and the additional measurement information are displayed in at least two steps.

3. The method according to claim 1, further comprising:
   identifying a current representation form of the different representation forms of the at least one digital display object using the additional measurement information and/or a further piece of additional measurement information.

4. The method according to claim 1, wherein the additional measurement information encodes a material type of the object under investigation.

5. The method according to claim 1, further comprising:
   changing a coding of the additional measurement information.

6. The method according to claim 1, wherein the additional measurement information represents a depth reference as a function of the determined material property.

7. The method according to claim 1, further comprising:
   displaying a coding of the additional measurement information.

8. The method according to claim 1, further comprising:
adjusting a displayed value range for the determined material property and/or the additional measurement information.

9. The method according to claim 1, wherein:
the material investigation device includes a control unit configured to perform the method, the control unit operably connected to the physical display unit, and
the physical display unit is a color display.

10. The method according to claim 1, wherein the sensor range moves together with the material investigation device in relation to the object under investigation.

11. The method according to claim 1, wherein the sensor range moves with an orientation of a sensor unit of the material investigation device in relation to the object under investigation.

12. The method according to claim 1, wherein the sensor range is a measurement volume associated with the sensor unit.

13. The method according to claim 1, wherein the further digital display object representing the sensor range includes at least one boundary marker having a location based on a sensitivity of the sensor unit.

14. The method according to claim 13, wherein the changing of the representation of the further digital display object representing the sensor range includes outputting a warning or an all-clear.

15. The method according to claim 13, wherein the changing of the representation of the further digital display object representing the sensor range includes changing a color of the further digital display object.

16. The method according to claim 15, further comprising:
showing the at least one boundary marker in red in a first instance, and
showing the at least one boundary marker in green or white in a second instance.

17. The method according to claim 16, wherein:
in the first instance, a predetermined drilling depth cannot be achieved due to a foreign object, and
in the second instance, no foreign object has been determined within the predetermined drilling depth.

* * * * *